(12) United States Patent
Bunn et al.

(10) Patent No.: US 6,286,805 B1
(45) Date of Patent: Sep. 11, 2001

(54) APPARATUS AND METHOD FOR TRANSPORTING EQUIPMENT BETWEEN BUILDINGS

(75) Inventors: William Bunn, Brighton; John C. Spencer, Longmont; Stephen P. Kregstein, Golden; Mark Lamphier, Littleton; Donald B. Wingerter, Jr., Evergreen, all of CO (US)

(73) Assignee: Clear Vision Laser Centers, Inc., Lakewood, CO (US)

( * ) Notice: Subject to any disclaimer, the term of this patent is extended or adjusted under 35 U.S.C. 154(b) by 0 days.

(21) Appl. No.: 09/108,613

(22) Filed: Jul. 1, 1998

(51) Int. Cl.$^7$ .................................................. G16M 13/00
(52) U.S. Cl. ..................... 248/544; 410/77; 108/57.12; 414/373
(58) Field of Search ..................... 248/561, 603, 248/618, 619, 626, 631, 632, 634, 638, 636, 673, 678, 346.02, 346.03, 346.05, 346.06; 410/77, 80, 84, 87; 108/57.12, 55.3; 414/373

(56) References Cited

U.S. PATENT DOCUMENTS

| | | | |
|---|---|---|---|
| 3,090,331 | 5/1963 | McCann | 108/51 |
| 3,267,882 | 8/1966 | Rapson et al. | 108/51 |
| 3,276,530 | 10/1966 | Bornehan | 180/7 |
| 3,351,027 | 11/1967 | Ellard, Jr. et al. | 108/51 |
| 3,361,444 * | 1/1968 | Harbers | 410/87 X |
| 3,440,976 | 4/1969 | Burne | 108/51 |
| 3,860,889 | 1/1975 | Caruolo et al. | 331/94.5 R |
| 4,190,227 * | 2/1980 | Belfield et al. | 248/618 X |
| 4,227,843 * | 10/1980 | Damm | 410/87 X |
| 4,577,671 * | 3/1986 | Stephen | 164/401 |
| 5,195,439 | 3/1993 | Harder | 108/51.1 |
| 5,505,140 | 4/1996 | Wittmann | 108/51.1 |
| 5,911,179 * | 6/1999 | Spiczka | 108/57.12 X |

OTHER PUBLICATIONS

Enidine Catalog, Steelpaw™ Wire Rope Isolators Application and Selection Guide, All pages.
Enidine Catalog, Air Springs Product Catalog and Selection Guide, All pages.

* cited by examiner

*Primary Examiner*—Ramon O. Ramirez
*Assistant Examiner*—Kimberly Wood
(74) *Attorney, Agent, or Firm*—Sheridan Ross P.C.

(57) ABSTRACT

An apparatus for reducing shocks and vibrations that equipment can be subject to when the equipment is moved is provided. The apparatus includes a stationary support assembly fixedly held in a transport unit that is moved using a vehicle and a movable support assembly fixedly connected to the equipment. The stationary support assembly includes a number of isolator members that prevent unwanted shocks and vibrations from affecting the equipment being transported. A pallet truck is used to separate the equipment and the movable support assembly from the stationary assembly and then carry them to their next location. The movable support assembly includes a number of inflatable air bladders that are sufficiently pressurized to prevent unwanted shocks and vibrations from affecting the equipment as it is moved from the transport unit to its next location. The equipment being moved can include laser equipment for use in performing eye corrective procedures and which has sensitive, aligned and calibrated components.

3 Claims, 5 Drawing Sheets

APPARATUS AND METHOD FOR TRANSPORTING EQUIPMENT BETWEEN BUILDINGS

FIELD OF THE INVENTION

The present invention relates to moving an apparatus from one location to another and, in particular, moving equipment having sensitive, calibratable components.

BACKGROUND OF THE INVENTION

Larger size or heavy systems that have one or more calibrated components for performing desired functions are typically installed and calibrated in one building and not moved. Such systems commonly remain at one location and are maintained on a regular basis to make sure that they operate properly. Typically, there is no beneficial reason to move such systems on a frequent basis.

A heavy and voluminous system including laser equipment is used in eye surgery to correct for nearsightedness and astigmatism. Briefly, the applied laser energy corrects the refraction of the eye by essentially flattening the cornea. Such equipment and components are expensive, in the range of several hundreds of thousands of dollars. In many cases, this eye surgical procedure is not yet performed a sufficient number of times at any one location or facility to be cost effective. That is, because of the equipment cost, it is not financially feasible for one facility to have its own full-time laser system for performing the surgical procedures on the eye(s). A sharing of a single system by a number of facilities has proven to be cost effective. This requires transport of the laser equipment from one facility to another, namely between buildings and typically from one city to another or from one part of the city to another location in the same city. The laser equipment has sensitive components that need to be accurately aligned and calibrated. When the equipment is moved, the components thereof are subject to shocks and vibrations that could detrimentally affect such alignment and calibration. When such effects occur, damage to the equipment can result, or such components can become misaligned or out-of-calibration. Consequently, after transport of the equipment has been completed, it is then necessary to make sure that the equipment is working properly including taking care of any misalignment and out-of-calibration. This can be time consuming and expensive and can be even more costly if the equipment or components are damaged to the extent that the necessary alignment and calibration can no longer be properly achieved.

Because of the cost of the laser system, coupled with the current market demand for the corrective eye procedure, it would be advantageous to provide an apparatus that is able to suitably protect the laser equipment during its transport from one location to another. one known apparatus includes a support platform with pneumatic wheels that are apparently intended to provide a cushioning effect to the laser equipment as it is moved. The present invention is directed to providing enhanced features that protect the laser equipment from shocks and vibrations during the time that the laser equipment is being moved.

SUMMARY OF THE INVENTION

In accordance with the present invention, an apparatus for moving equipment having sensitive components from one location to another location is provided, while protecting the sensitive equipment components from being subjected to unwanted shocks and vibrations caused by the movement. The equipment is moved in and to/from a transport unit, such as a trailer, using the apparatus or portions thereof.

The apparatus includes a first or stationary support assembly that is fixedly held within the transport unit and stays with the transport unit when the laser equipment is moved from the transport unit to its next location. The stationary support assembly includes a bracket assembly configured substantially in a U-shaped arrangement. The bracket assembly is connected to the floor of the transport unit. A frame assembly overlies the bracket assembly. The frame assembly is also substantially U-shaped in configuration. The frame assembly has a pair of leg extensions and a cross extension between the two leg extensions. Each leg extension includes a plate member. A number of isolator members are disposed between the bracket assembly and the leg extensions at the ends thereof. The isolator members counter or isolate shocks and vibrations that, in their absence, could otherwise be transmitted to the laser equipment components when the transport unit is moved or transported. In one embodiment, the isolator members each include a number of coils made of numerous and thick wire strands. The tops of such wire rope isolator members are located beneath the leg extensions, while the bottoms thereof contact the bracket assembly.

The frame assembly also includes upwardly extending, but relatively short, walls that extend from the leg extensions. The leg extensions of the frame assembly also have elongated stop members overlying the plate members. The stop members are useful in preventing unwanted movement of the laser equipment during transport in the transport unit, as will be further explained later herein.

The apparatus also includes a second or movable support assembly that is connected to the equipment to be moved. The movable support assembly is joined to the bottom of the equipment being moved. The movable support assembly includes a deck having a base with an upper surface. Secured to the base is an air cushioning assembly also used in safeguarding the equipment during its transport. The air cushioning assembly includes a manifold and a number of air bladders, with the manifold in fluid communication with each of the air bladders using connector tubing or hoses for carrying pressurized air. In one embodiment, there are four air bladders located adjacent to the four corners of the movable equipment. The air bladders can be inflated and deflated at appropriate or predetermined times during movement of the equipment.

The apparatus also includes a pallet truck or other powered vehicle for engaging the deck and moving the movable support assembly together with the equipment to which the movable support assembly is connected. The pallet truck has a pair of fork members that are positionable beneath the base of the deck for releasable engagement therewith. The pallet truck has support wheels which enable the equipment to be readily moved when supported using the pallet truck. Such support wheels are within the two fork members and are movable between a first position in which they do not contact the floor surface and a second position in which they do contact the floor surface in order to facilitate movement of the movable support assembly and the laser equipment by the pallet truck as it is driven or otherwise moved.

In conjunction with the movement of the laser equipment, such equipment is typically used at one facility for a scheduled number of days or other period of time. The laser equipment is housed in a suitable room in a desired building at one facility. When it is appropriate or otherwise desirable to move the equipment having the movable support assembly connected thereto, a number of key steps are performed. In one embodiment, a thick cover is secured about the exterior of the equipment to ensure that no unwanted contact occurs between the equipment and building walls and doorways or objects in the building as the equipment is being moved from the building.

During use of the equipment, such as the laser equipment to perform corrective eye surgery, the air bladders are preferably in a deflated state. When moving the equipment and the movable support assembly with the pallet truck, the air bladders are inflated to at least a threshold or predetermined pressure. Shocks and vibrations are generated during movement of the equipment. Such shocks and vibrations can detrimentally impact or affect the equipment and its sensitive components. The inflated air bladders at the corners of the equipment between the deck and the equipment provide a cushion that prevents such unwanted shocks and vibrations from damaging or otherwise negatively affecting sensitive system components. In filling the air bladders, a separately powered air pump can be employed that has an outlet tube and connector that is adapted to mate with the air manifold on the upper surface of the base of the deck. The pallet truck is positioned such that the fork members are received beneath the base of the deck. The fork members are adjusted or changed in position to properly engage the deck. The fork members are raised to lift the equipment and the movable support assembly above floor surface.

The pallet truck is then steered to move the equipment and the movable support assembly along a suitable path from the building and then to the transport unit. The back doors of the transport unit are opened and a ramp is positioned so that the equipment and movable support assembly connected thereto can be driven up the ramp towards the stationary support assembly that is maintained in the transport unit. The pallet truck manipulates the equipment and the movable support assembly that it contacts so that they are properly vertically positioned relative to the stationary support assembly. When properly located, the fork members can be lowered so that at least portions of the walls and one end wall of the movable support assembly are within and engage the frame walls of the stationary support assembly. When securely held in position using the stationary support assembly, the air bladders are deflated prior to moving the transport unit using a truck or other vehicle to the next facility that will use the laser equipment.

During transport over the roads, shocks and vibrations can also be generated that could detrimentally affect the laser equipment. During such transport, the isolator members function to safeguard the laser equipment from unwanted shocks and vibrations. When the transport unit reaches the next facility, the laser equipment, together with the movable support assembly connected thereto, can then be separated from the stationary support assembly. In that regard, the air bladders are once again inflated and the pallet truck including its fork members are used to lift and separate the movable support assembly including the deck and air bladders from the stationary support assembly, which remains with the transport unit. Just as before with the pallet truck being used to. remove the equipment from the building that is currently finished with its use, the pallet truck is now used to support and carry the laser equipment to another building room, which will contain the laser equipment for the next scheduled period of time in connection with conducting the eye surgical procedures. After being transported to this next building room, the pallet truck fork members can slowly lower the laser equipment and the movable support assembly. The protective cover can be removed. The air bladders can be deflated and the laser equipment components can be properly and efficiently prepared for their intended usage.

Based on the foregoing summary, a number of salient features of the present invention are readily identified. Apparatus and method are provided for moving heavy and sensitive systems that include components subject to alignment and calibration. These systems can include laser components that are used to perform eye corrective procedures, such as correcting nearsightedness and astigmatism. The movement of the equipment is typically conducted into and out of buildings, together with the transport by a trailer of the equipment to another city or another location in the same city. Unwanted shocks and vibrations that occur when such equipment is moved do not damage or significantly alter the sensitive components. Specifically, two separate and different mechanisms are employed to prevent shock and vibration damage including inflatable air bladders and isolator members. A pallet truck readily engages the equipment for desired movement thereof using support wheels movably positioned in its fork members. A cover can be utilized to safeguard the exterior of the equipment and prevent possible contact with building walls, doorways and objects.

Additional advantages of the present invention will become readily apparent from the following discussion, particularly when taken together with the accompanying drawings.

DETAILED DESCRIPTION

Figure 1:
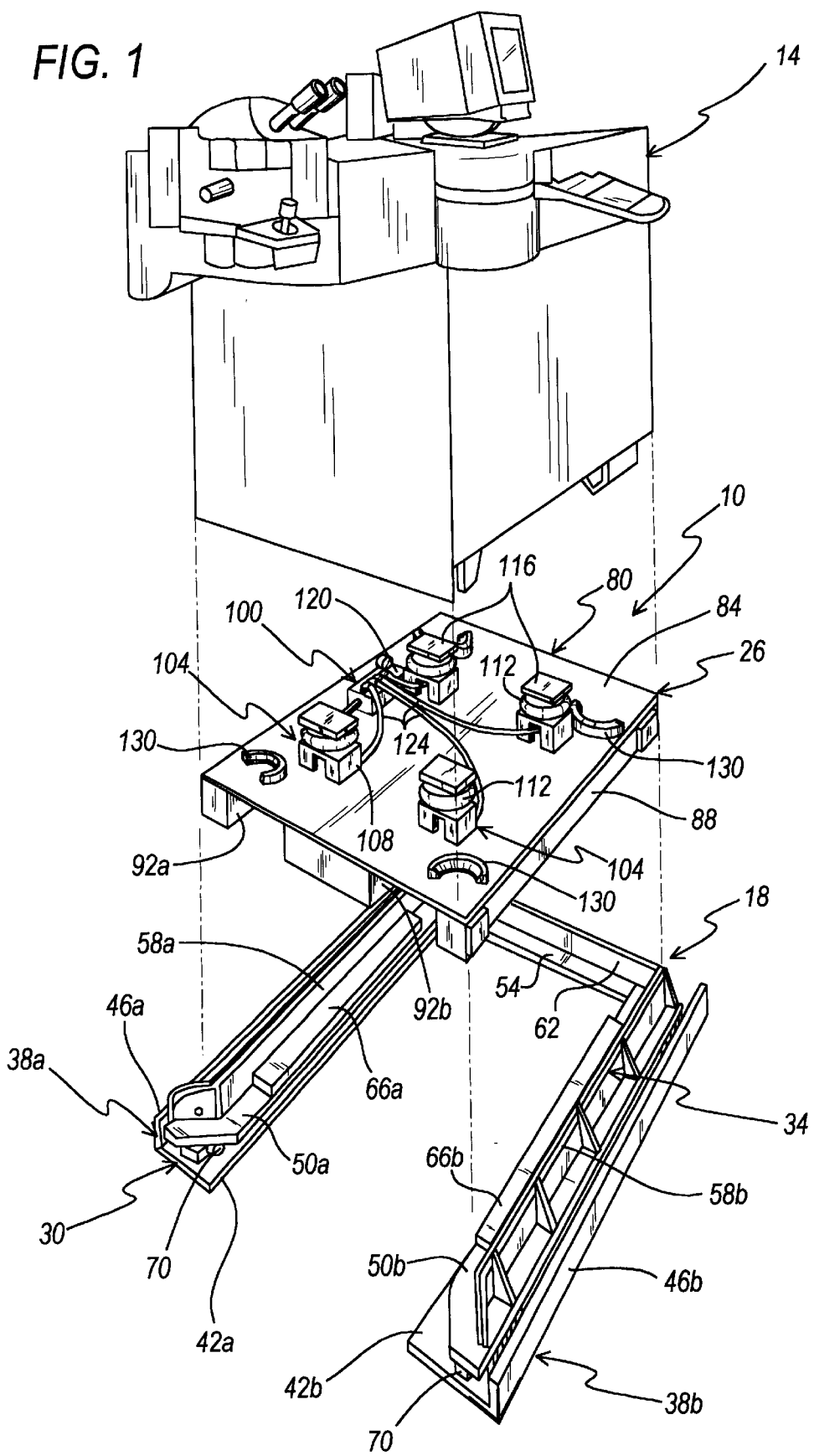
FIG. 1 is an exploded view of the arrangement among the stationary support assembly, the movable support assembly and the laser equipment.

With reference to FIG. 1, an apparatus 10 is illustrated for eliminating, or at least reducing, unwanted shocks and vibrations that might be applied to equipment 14 during its transport from one building at a first facility to another building at a second facility, which is typically located in a different city or another part of the same city. In one embodiment, the equipment 14 has sensitive components that require alignment and calibration. Unwanted shocks or vibrations can detrimentally affect their proper functioning. Such sensitive equipment can include laser equipment useful in performing corrective eye surgical procedures, such as to correct for nearsightedness or astigmatism.

Figure 2:
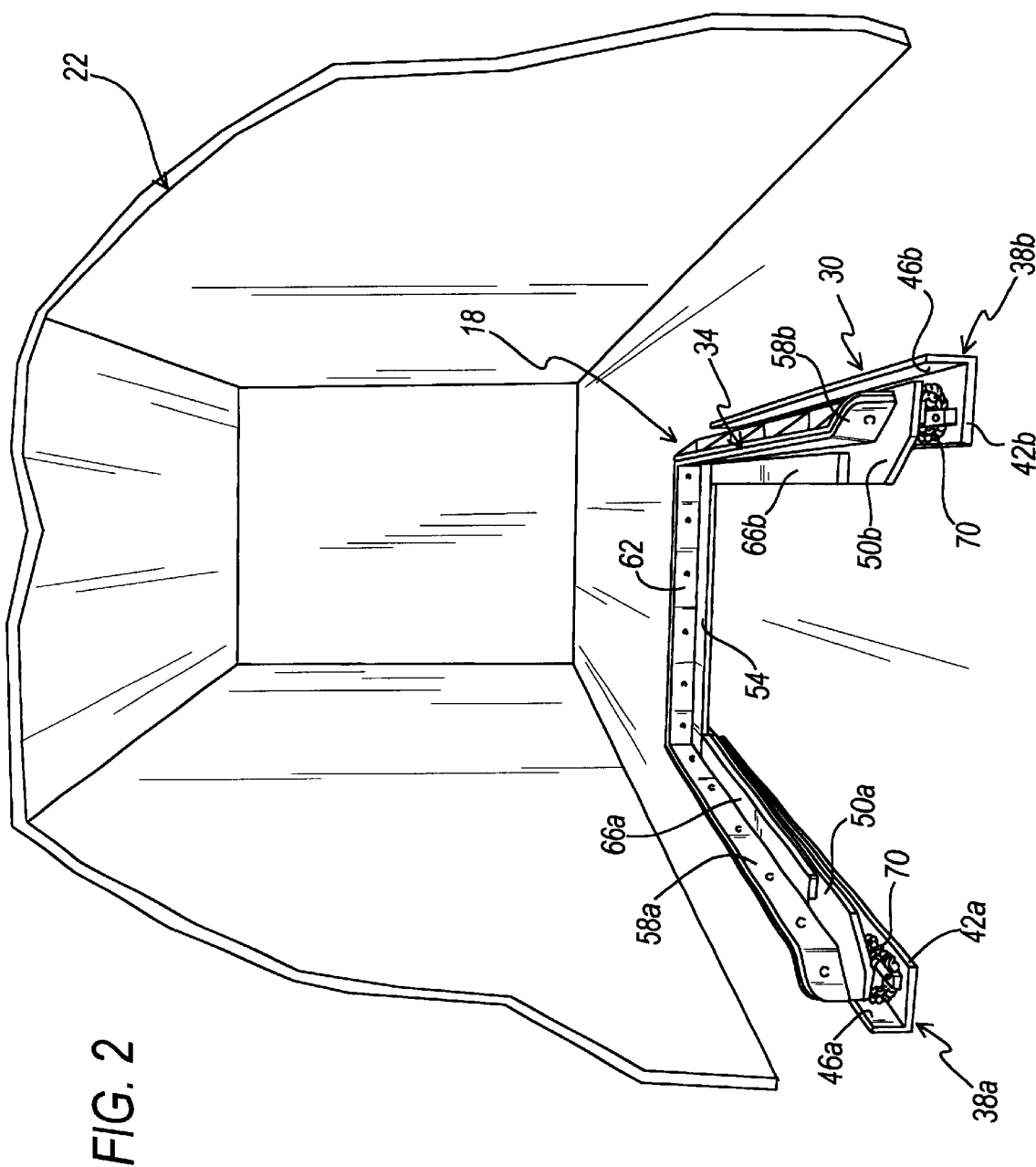
FIG. 2 illustrates a perspective view of the frame and bracket assemblies connected to the trailer unit.

The apparatus 10 includes a stationary support assembly 18. As seen in FIG. 2, it is fastened or otherwise joined to a transport unit 22, such as a trailer but which could be any other movable unit including a truck bed. The apparatus 10 also includes a movable support assembly 26 which remains connected to the bottom of the equipment 14. Generally, the stationary support assembly 18 is useful in reducing shocks and vibrations that might be subjected to the equipment 14 when the equipment 14 is being transported using the transport unit 22 and the movable support assembly 26 is useful in reducing shocks and vibrations when the equipment 14 is moved to and from the transport unit 22, as will be explained in greater detail later herein.

With continued reference to FIG. 1, as well as FIG. 2, the stationary support assembly 18 includes a bracket assembly 30 and a frame assembly 34, which overlies the bracket assembly 30. The bracket assembly has two bracket members 38a, 38b. Each of the bracket members 38a, 38b is generally L-shaped in cross-section, which is defined by respective lateral legs 42a, 42b and vertical legs 46a, 46b. The lateral legs 42a, 42b are preferably fastened to the floor or bed of the trailer or other transport unit 22 using bolts or the like. The frame assembly includes a pair of parallel extending plate members 50a, 50b that are joined together by a cross member 54. Integral with the plate members 50a, 50b are respective sidewalls 58a, 58b. An end wall 62 of the frame assembly 34 is integral with the cross member 54. Stop members 66a, 66b overlie and are held to the upper surfaces of the plate members 50a, 50b respectively. The stop members 66a, 66b are useful in preventing unwanted lateral movement of the combination of the equipment 14 and the movable support assembly 26, as will be further noted subsequently herein.

The stationary support assembly 18 further includes a number of mechanisms or devices that eliminate, or substantially reduce, shocks and vibrations that might be transmitted to the equipment 14 when it is supported using the stationary support assembly 18. In one embodiment, these devices include a plurality of isolator members 70 that are disposed between and connected to the bottom surfaces of the plate members 50a, 50b and the upper surfaces of the lateral legs 42a, 42b. Preferably, the isolator members 70 are adjacent to the four ends of the bracket assembly 30, namely, the opposite ends of the two lateral legs 42a, 42b. Such isolator members 70 can be wire rope isolators that are commercially available for protecting equipment from potentially harmful shocks and vibrations that might otherwise be experienced by the equipment when it is moved, in the absence of such isolator members 70. The isolator members 70 include a number of thick, heavy strands of wire, which are of a size and length to achieve the objective of avoiding shock and vibration effects to the equipment being moved. One currently available source of wire rope isolators is Enidine Incorporated of Orchard Park, NY. These wire rope isolators provide multi-axis isolation in effectively handling potentially detrimental shocks and vibrations.

Figure 3:
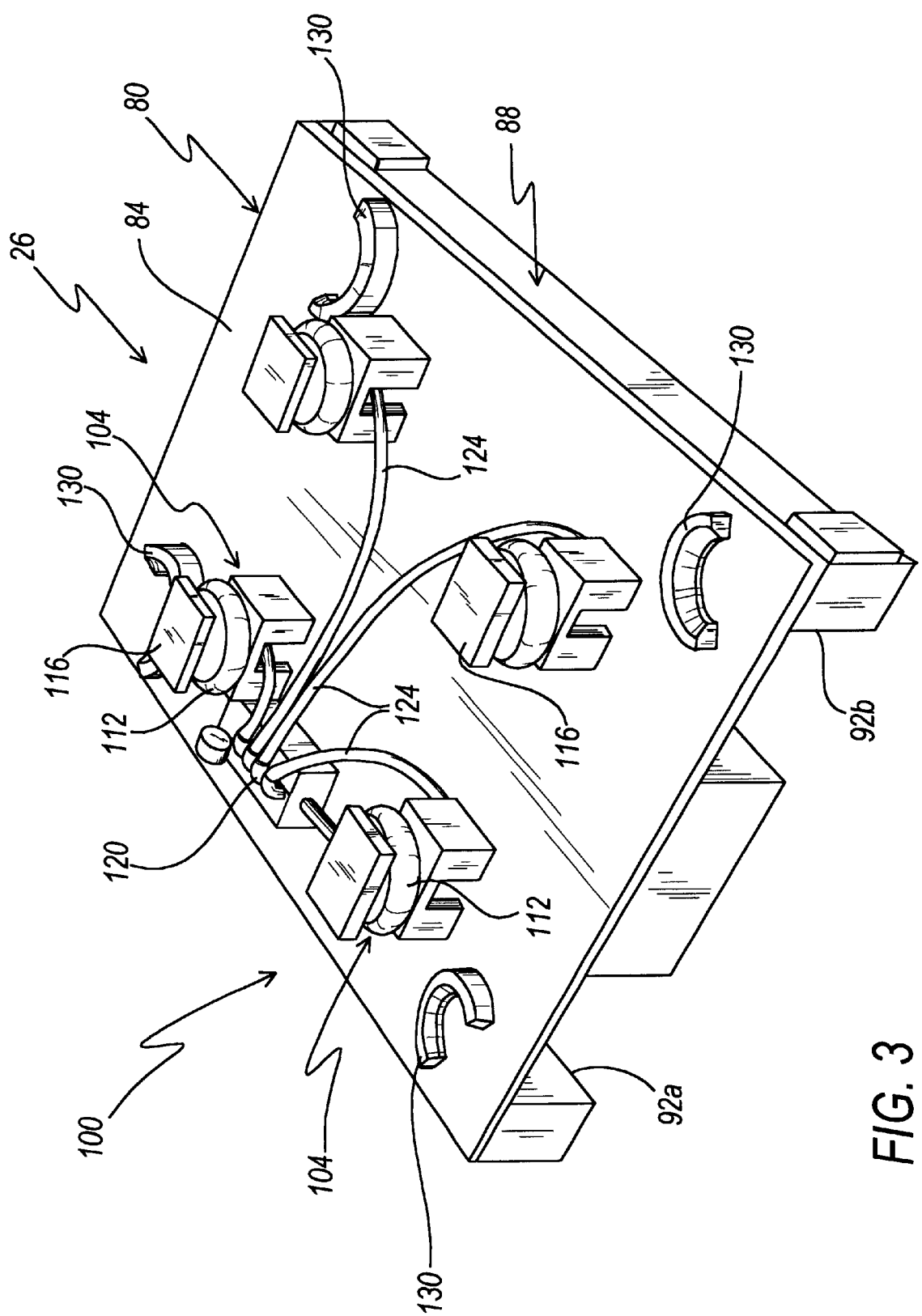
FIG. 3 illustrates a perspective view of the movable support assembly including the deck and air bladders mounted thereto.

With continued referenced to FIG. 1, as well as FIG. 3, the movable support assembly 26 includes a deck 80 with a base 84 and a platform 88 connected to the bottom of the base 84. The platform 88 has a number of separate pieces that define openings 92a, 92b. The openings 92a, 92b are used in accessing and engaging the bottom or lower surface of the base 84 in connection with movement of the equipment 14 and the movable support assembly 26, as will be described later. With reference to the upper surface of the base 84, a second assembly is next described for eliminating or at least reducing vibrations and shocks that might otherwise be applied to the equipment 14 during its transport. In that regard, an air cushioning assembly 100 is provided that utilizes air and associated hardware for absorbing shocks and vibrations. The air cushioning assembly loo includes a number of air support subassemblies 104 that are located adjacent to the four corners or ends of the equipment 14 to which the movable support assembly is connected. Each of the air support subassemblies includes a pedestal 108 held to the base 84 of the deck 80. An air bladder or air spring 112 is joined to the upper surface of the pedestal 108. Each air bladder 112 can be inflated with air. A contact plate 116 overlies each of the air bladders 112. The contact plate 116 directly engages or comes in contact with the bottom surface of the equipment 14 to which the movable support assembly is connected. The air bladders 112 can include the air springs available from Enidine Incorporated.

With regard to inflation/deflation of the air bladders 112, a manifold 120 is provided that is joined to the outer surface of the base 84. Fluid communication for supplying of pressurized air to the air bladders 112 is accomplished using a number of connector tubes or hoses 124. The connector hoses 124 carry air relative to the air bladders 112. An air pump or similar device is connectable to the manifold 120 for supplying the necessary air, when desired, to each or selected ones of the air bladders 112.

The movable support assembly 26 also preferably includes a number of blocking pieces 130 that are joined adjacent the four corners of the base 84 and are disposed outward relative to the air support subassemblies 104. Such blocking pieces 130 are used in holding or engaging foot members 160 (FIG. 4) connected to the equipment 14 in order to assist in providing a secure engagement or connection between the equipment 14 and the movable support assembly 26.

Figure 4:
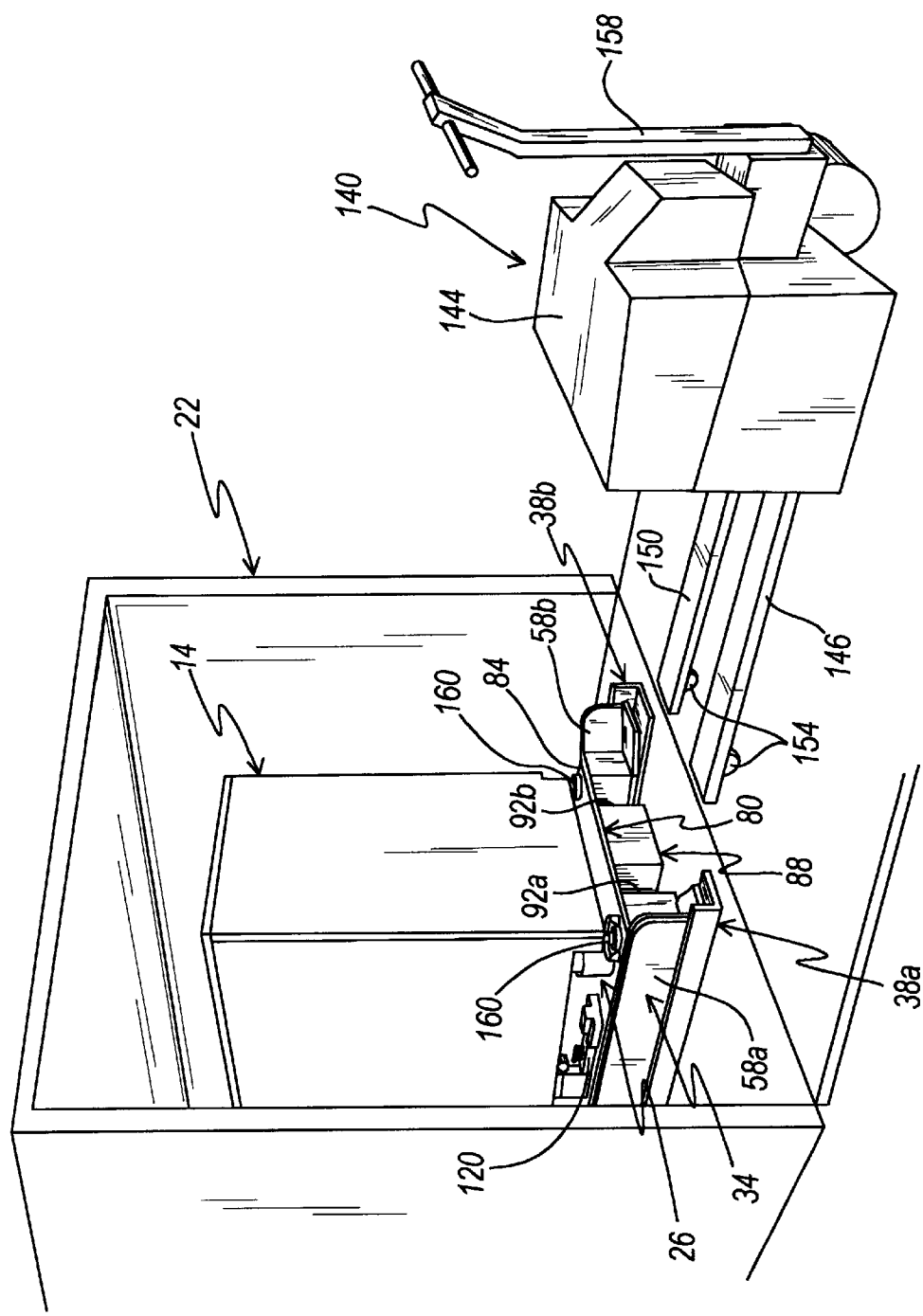
FIG. 4 illustrates a perspective view of the bracket and frame assemblies, deck and laser equipment joined together in the transport unit and with the pallet truck for use in separating the laser equipment and movable support assembly from the stationary support assembly.

With reference to FIG. 4, when moving the equipment from the transport unit 22, as part of moving it from one facility to another facility, the apparatus 10 also includes a pallet truck or vehicle 140. The pallet truck 140 is a powered vehicle that is able to carry the equipment 14 and the movable support assembly 26, as well as raise/lower them relative to the stationary support assembly 18. The pallet truck 140 includes a body 144 from which a pair of fork members 146, 150 extend. Suitably located are wheels 154 that extend adjacent the bottom surfaces of the two fork members 146, 150. The wheels 154 are useful in moving the equipment 14 along the floor or ground surface that the pallet truck 140 moves along in carrying the equipment 14 relative to the transport unit 22. The pallet truck 140 also includes a handle 158 that is utilized by the operator in connection with driving and steering the pallet truck 140.

As seen in FIG. 4, the equipment 14, the stationary support assembly 18 and the movable support assembly 26 are positioned relative to each other for transporting the equipment 14 using the transport unit 22. Once the transport unit 22 reaches its destination at which the equipment 14 is to be used, the back of the transport unit 22 is accessed by the pallet truck 140 in connection with removing the equipment 14, together with the movable support assembly 26 to which it is connected. With respect to this arrangement, the movable support assembly 26 is positioned within the frame assembly 34. In that regard, the inner surfaces of the frame assembly walls 58a, 58b supportingly contact outer surfaces or walls of the platform 88. The stop members 66a, 66b are positioned relative to these pieces of the platform 88 to prevent unwanted lateral movement in a direction parallel to the bottom of the transport unit 22.

With respect to the connection and other engagement between the bottom of the equipment 14 and the movable support assembly 26, the foot members 160 are provided at the bottom of the equipment 14 and extend toward and are supported by the upper surface of the base 84 of the deck 80. In this position, the combination of the equipment 14 and the movable support assembly 26 overlie the stationary support assembly 18 and are supported thereby. When in this positioning or relationship among the equipment 14, the stationary support assembly 18 and the movable support assembly 26, the air bladders 112 are deflated and are essentially not used to reduce shocks and vibrations. This deflation state of the air bladders 112 is utilized when the equipment 14 is being transported using the transport unit 22 in connection with moving the equipment 14 from one location to another location. When the air bladders 112 are deflated, reduction or prevention of unwanted shocks and vibrations being transmitted to the equipment 14 is accomplished using the isolator members 70. As can be appreciated, to deflate the air bladders 112, the manifold 120 and the connector hoses 124 are used to remove the air from previously inflated air bladders 112.

After reaching the next location or destination, the equipment 14, is removed from the transport unit 22 using the pallet truck 140. As part of the removal procedure, the air bladders 112, that were in their deflated state during transport or movement of the equipment 14 in the transport unit 22, receive or are pressurized with air by means of, for example, an air pump, in combination with the manifold 120 and the connector hoses 124. Either before or after inflation of the air bladders 112, the fork members 146, 150 of the pallet truck 140 are positioned through the openings 92a, 92b in the platform 88. With the inflated air bladders 112, the pallet truck 140 is controlled to raise the fork members 146, 150 and thereby raise the combination of the equipment 14 and the movable support assembly 26 connected thereto. This causes a separation of the combination of the equipment 14 and the movable support assembly 26 from the stationary support assembly 18 by a raising of the equipment 14 and the movable support assembly 26 in a vertical direction relative thereto. Once the equipment 14 and the movable support assembly 26 have been raised sufficiently, they can be removed from the transport unit 22 by properly driving or manipulating the pallet truck 140 in a direction away from the transport unit 22.

Figure 5:
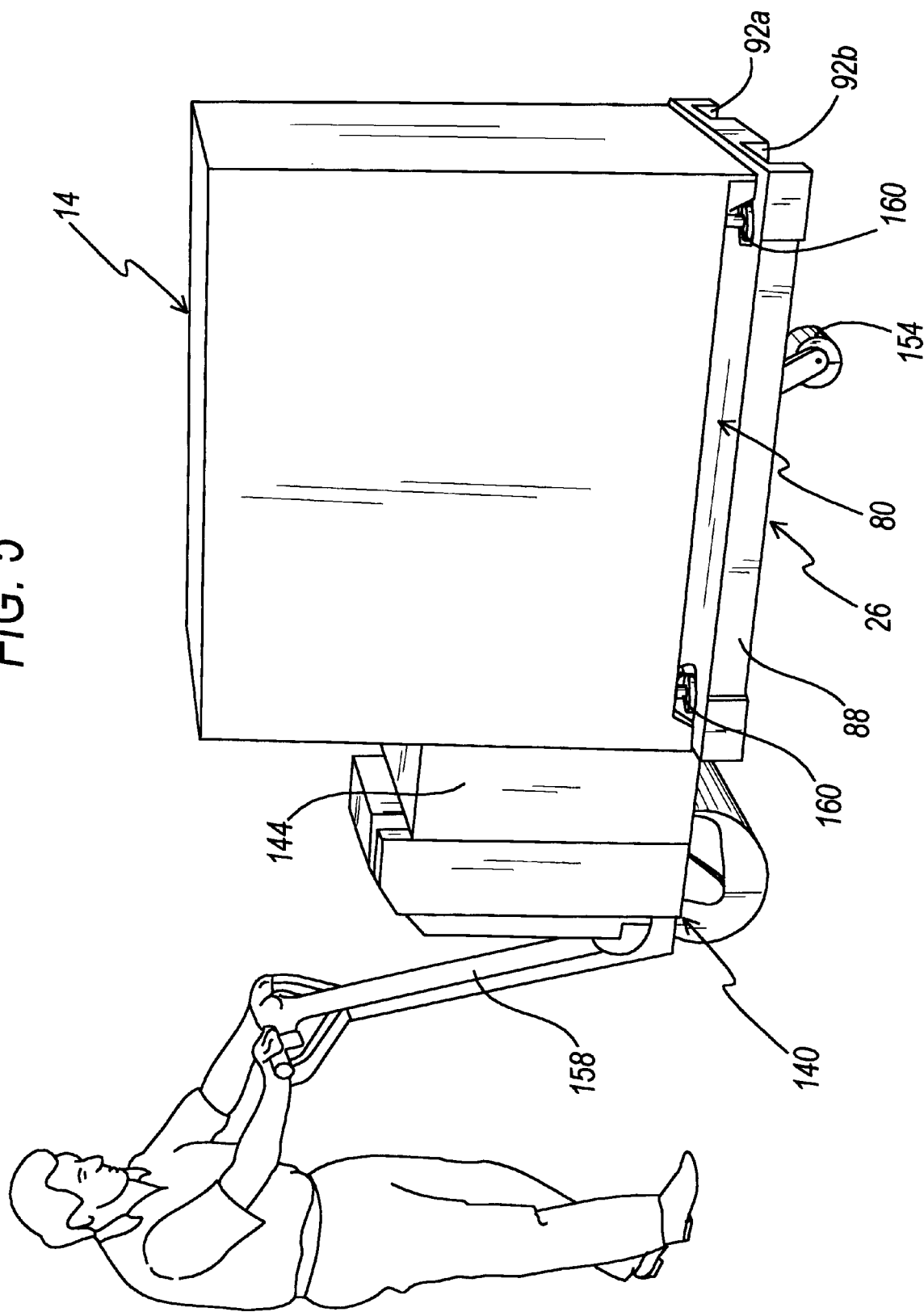
FIG. 5 is a perspective view of the movable support assembly and the laser equipment, together with the pallet truck being able to move them using engagement between the pallet truck fork members and the deck, as well as the support wheels of the pallet truck fork members contacting the floor's surface.

With reference to FIG. 5, continued movement of the equipment 14 and the movable support assembly 26 is illustrated using the pallet truck 140. The fork members 146, 150 continue to support and maintain the movable support assembly 26 and the equipment 14 connected thereto above the ground or floor surface, while the fork member wheels 154 assist in their movement over the ground surface or any floor surface that must be traversed in transporting the equipment 14 to the next building room in which it will be used, such as a hospital room for conducting corrective eye surgery using laser equipment. During the movement, the operator or mover steers and drives the pallet truck 140 along a suitable path, with the air cushioning assembly 100, particularly the inflated air bladders 112 functioning to prevent or reduce shocks and vibrations from being transmitted to the equipment 14.

Once the desired room for use of the equipment 14 is reached and the equipment 14 and the movable support assembly 26 are properly positioned in the room, the fork members 146, 150 are lowered and the pallet truck 140 is disengaged from the movable support assembly 26, particularly the fork members 146, 150 are moved away from the openings 92a, 92b of the platform 88. The air bladders 112 can then be deflated. The equipment is checked or otherwise prepared for use thereof. When it is desired to again move the equipment 14 from the current room in which it is housed, the air bladders 112 are once again inflated with air using the air pump or the like. The pallet truck 140 including the fork members 146, 150 are positioned to engage and lift the equipment 14 and the movable support assembly 26. After being raised vertically, the pallet truck 140 is driven and steered to support and carry the equipment 14 from its current room back to the transport unit 22, which will again be used to carry the equipment 14 to its next location. In that regard, the movable support assembly 26 and the equipment 14 are again lowered relative to the stationary support assembly 18 to be held and supported thereby. The air bladders 112 are deflated for transport of the equipment 14 using the transport unit 22 to its next facility or location.

The apparatus 10 can also include a winch device contained in the transport unit 22. The winch device may be beneficial in assisting in the removal of the equipment 14 from the transport unit 22. The winch device includes a cable that is attachable to the pallet truck 140. The winch device can be relied on in controlling or reducing the speed at which the equipment 14 is removed from the transport unit 22. In addition, a cover can be provided to surround exterior portions of the equipment 14 and the movable support assembly 26. Such a cover has sufficient thickness to protect the equipment 14 from unwanted contact that might occur along the path to the next room in which the equipment will be utilized, with such a path typically including doorways, hallways, elevators and objects along the path.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments discussed hereinabove are further intended to explain the best mode known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. An apparatus for reducing shocks and vibrations transmitted to equipment during the equipment movement from a first facility to a second facility, comprising:

a stationary support assembly for underlying the equipment during the equipment movement to the second facility that includes at least a first member that reduces shocks and/or vibrations, said stationary support assembly including a bracket assembly and a frame assembly and having a lateral extent, a longitudinal extent and a thickness, said frame assembly including at least a first plate member and said bracket assembly including at least a first leg, said first member being connected to said bracket assembly and being disposed between said first plate member and said first leg, each of said first plate member and said first leg extending for at least a majority of one of said longitudinal extent and said lateral extent of said stationary support assembly;

a movable support assembly for connection to the equipment and securely engaged to said stationary support assembly when the equipment is being moved to the second facility, wherein said movable support assembly includes at least a second member that reduces shocks and/or vibrations, said movable support assembly having a lateral extent, a longitudinal extent and a thickness in which at least a majority of said lateral extent and a majority of said longitudinal extent of said movable support assembly contact said stationary support assembly when the equipment is being moved to the second facility; and powered means for moving the equipment, wherein said powered means is for engaging said movable support assembly and is used in separating said movable support assembly from said stationary support assembly after the equipment has been moved to the second facility.

2. An apparatus, as claimed in claim 1, wherein:

said frame assembly has sections including said first plate member and said first member is connected between said bracket assembly and said sections of said frame assembly.

3. An apparatus, as claimed in claim 2, wherein:

said first member includes at least a first isolator member connected between said bracket assembly and said first plate member of said frame assembly.

* * * * *